(12) United States Patent
Stoop et al.

(10) Patent No.: US 9,367,568 B2
(45) Date of Patent: Jun. 14, 2016

(54) AGGREGATING TAGS IN IMAGES

(71) Applicant: Facebook, Inc., Menlo Park, CA (US)

(72) Inventors: Dirk John Stoop, Menlo Park, CA (US); Liu Liu, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 351 days.

(21) Appl. No.: 13/894,640

(22) Filed: May 15, 2013

(65) Prior Publication Data

US 2014/0344248 A1 Nov. 20, 2014

(51) Int. Cl.
*G06F 7/00* (2006.01)
*G06F 17/00* (2006.01)
*G06F 17/30* (2006.01)
*G06Q 50/00* (2012.01)

(52) U.S. Cl.
CPC .......... *G06F 17/30268* (2013.01); *G06Q 50/01* (2013.01)

(58) Field of Classification Search
CPC ............... G06F 17/30241; G06F 17/30268; G06F 17/30247; G06F 17/30598
See application file for complete search history.

(56) References Cited

U.S. PATENT DOCUMENTS

| 8,315,791 | B2 | 11/2012 | Bales |
| 8,578,274 | B2* | 11/2013 | Druzgalski et al. ........... 715/738 |
| 8,694,607 | B2* | 4/2014 | Darnell et al. ................ 709/218 |
| 2006/0248063 | A1* | 11/2006 | Gordon ............................. 707/3 |
| 2007/0271297 | A1 | 11/2007 | Jaffe et al. |
| 2008/0077595 | A1 | 3/2008 | Leebow |
| 2010/0035682 | A1* | 2/2010 | Gentile et al. .................. 463/30 |
| 2010/0185933 | A1 | 7/2010 | Coffman et al. |
| 2011/0182485 | A1 | 7/2011 | Shochat et al. |
| 2011/0202531 | A1 | 8/2011 | Zuckerberg |
| 2012/0278395 | A1 | 11/2012 | Garcia |
| 2012/0331091 | A1 | 12/2012 | Tseng |
| 2013/0069980 | A1 | 3/2013 | Hartshorne |
| 2013/0073400 | A1* | 3/2013 | Heath ......................... 705/14.73 |
| 2013/0262588 | A1* | 10/2013 | Barak ..................... H04L 67/22 709/204 |
| 2014/0012927 | A1* | 1/2014 | Gertzfield .............. G06Q 50/01 709/206 |
| 2014/0164938 | A1* | 6/2014 | Petterson et al. ............. 715/739 |
| 2014/0301464 | A1* | 10/2014 | Wu et al. .................. 375/240.15 |

FOREIGN PATENT DOCUMENTS

KR    10-2011-0036462    4/2011

OTHER PUBLICATIONS

U.S. Appl. No. 13/349,383, filed Jan. 12, 2012, Seligstein.
U.S. Appl. No. 13/801,802, filed Mar. 13, 2013, Chedeau.
U.S. Appl. No. 13/829,859, filed Mar. 14, 2013, Chedeau.
International Search Report and Written Opinion for International Application PCT/US2014/037808, Sep. 1, 2014.

\* cited by examiner

*Primary Examiner* — Susan Chen
(74) *Attorney, Agent, or Firm* — Baker Botts L.L.P.

(57) ABSTRACT

In one embodiment, a method includes receiving, from a first user associated with an online social network, a request to view an image associated with the online social network, accessing the image, wherein the image includes multiple tags corresponding to multiple objects, generating an aggregated tag for two or more of the tags based on the proximity of the tags to each other, determining a social-graph affinity for each object in the aggregated tag, and rendering the image with a tag-label for the aggregated tag, where the description in the tag-label is based on the social-graph affinity for the objects associated with the aggregated tag.

18 Claims, 6 Drawing Sheets

AGGREGATING TAGS IN IMAGES

TECHNICAL FIELD

This disclosure generally relates to online social networks and accessing content within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

The social-networking system may enable its users to upload digital media to the system for viewing by others. Digital media may include digital images, digital video, digital audio, computer games, digital books, digital text, other suitable digital media, or any combination thereof. A user of a social-networking system may upload the digital media (e.g., a digital image) to a file (e.g., an album) associated with their account on the social-networking system. Users of the social-networking system may view the digital media and select and tag a location of the image by selecting a point or area within the digital media and inputting an appropriate description to tag the region. Multiple locations within the media may be tagged. Some of the tags may correspond to particular users or content objects of the social-networking system.

SUMMARY OF PARTICULAR EMBODIMENTS

In particular embodiments, where an image has multiple objects tagged in the image, the social-networking system may aggregate two or more of the tags and render the image showing an aggregated tag representing the individual tags. When an image that has multiple objects tagged in it is rendered, the tag-labels for each tag may begin to overlap of the locations of the tagged objects are relatively close to each other in the photo. Similarly, the tags may begin to overlap (or overlap more) if the user zooms out so that the relative distance between the objects decreases. The problem of overlapping tag-labels may be especially pronounced in images with numerous tagged items, or when viewing images on relatively small displays (e.g., the display of a mobile client system), such that the tag-labels begin to impair viewing of the image or make the tag-labels themselves difficult to read. In these cases, tags for a group of objects may be aggregated into a single aggregated tag. Individual tags may be aggregated to form an aggregated tag once the individual tags are within a threshold distance of each other. Replacing individual tags with aggregated tags may help remove visual clutter from the image and improve readability of tag-labels. The tag-label for an aggregated tag may be generated based on the social-graph affinity of the objects included in the aggregated tag. The objects included in an aggregated tag may be varied as the viewing user zooms in and out of the image, such that additional objects may be added to the aggregated tag as the user zooms out, and objects may be removed from the aggregated tag as the user zooms in (i.e., the aggregated tag may begin to de-aggregate).

DESCRIPTION OF EXAMPLE EMBODIMENTS

Figure 1:
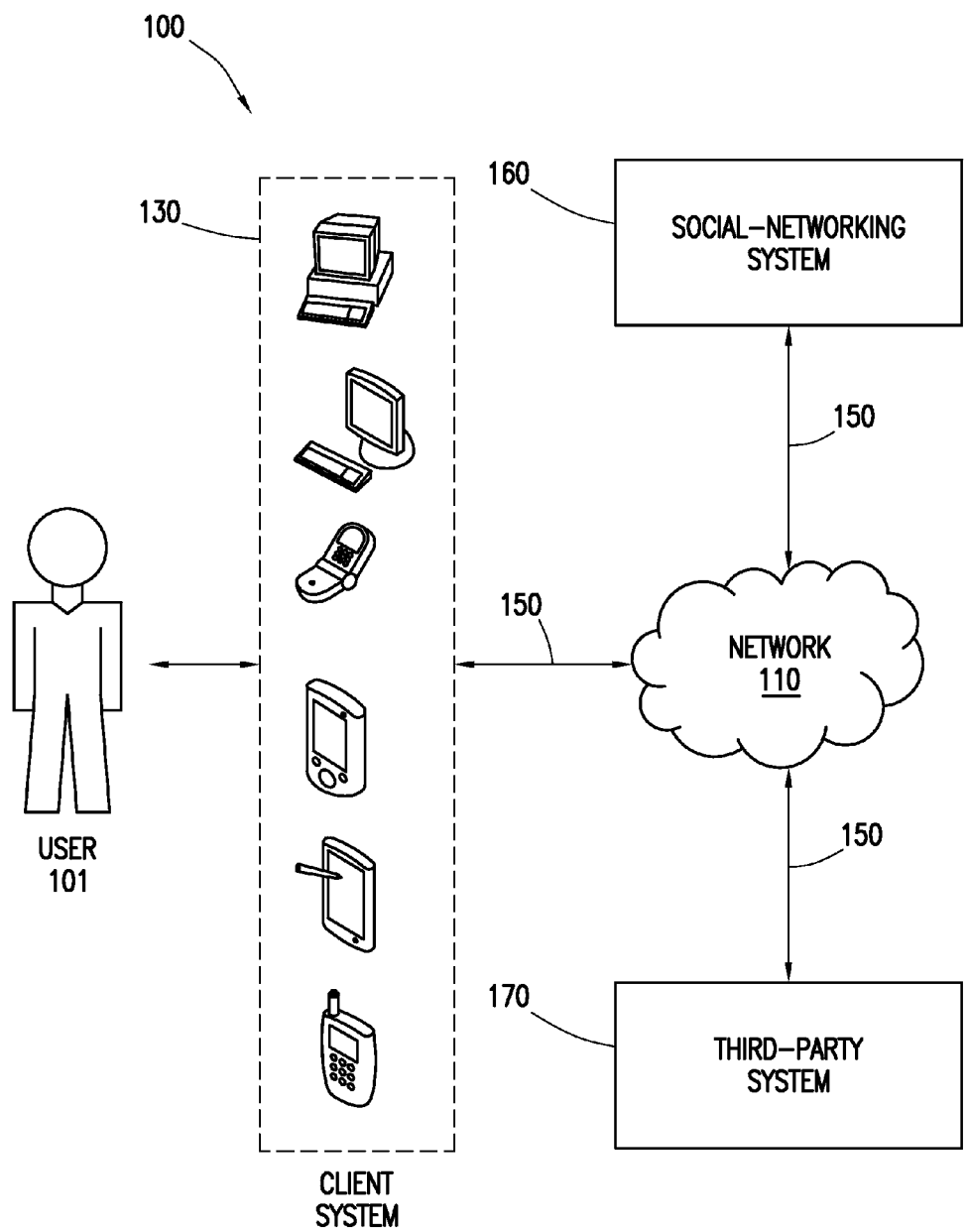
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110.

In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 170 may be a network-addressable computing system. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
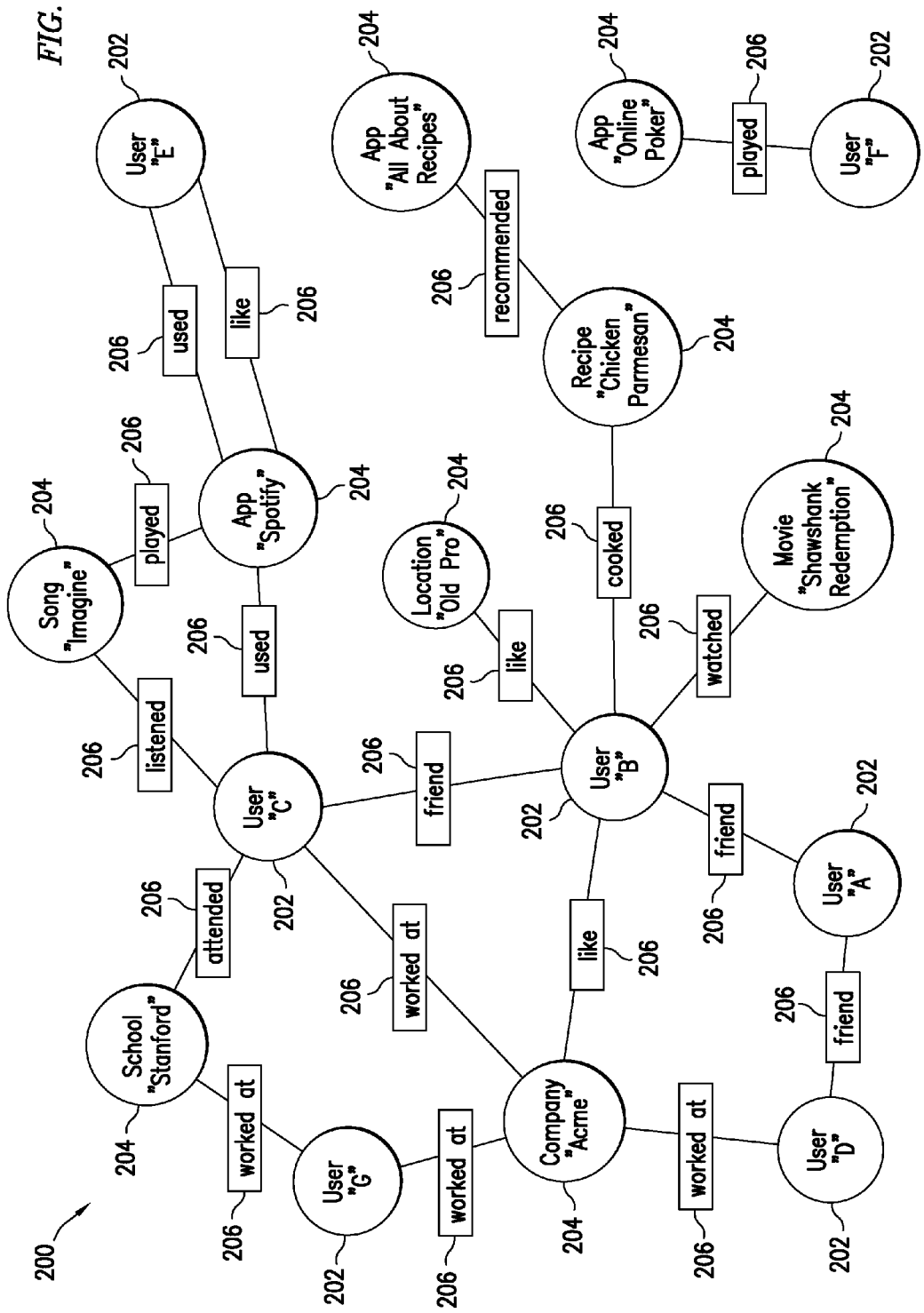
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like"

edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/976,859, filed 22 Dec. 2010, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, social-networking system 160 may enable its users to upload digital images to the system for viewing by others. Digital images may include digital photographs, illustrations, geographical maps, screenshots, video, other suitable digital images, or any combination thereof. A user may upload one or more digital images to a server managed by the online social network for storage or for sharing with other users. For example, the user may select a set of images stored on a client system 130, and instruct the client device 130 to establish a network connection with social-networking system 160 and upload the set of images to the online social network. The users may upload the digital image to a particular file or album associated with the user's account on the online social network. One or more other users of the online social network may then be able to view the digital image via social-networking system 160. A user may designate as private (or otherwise restrict access to) one or more images, or grant access to one or more images to certain other users of the online social network, based at least in part on privacy settings of the user.

In particular embodiments, a set of images associated with a first user may be viewable to other users of the online social network. As an example and not by way of limitation, if a second user visits a user profile of the first user, a set of images associated with the first user may be available for viewing by the second user (depending, e.g., on permissions or privacy settings of the first user and the relationship between the first user and the second user). The presentation of images to a user of a social-networking system is discussed in further detail in U.S. patent application Ser. No. 13/715,636, filed 14 Dec. 2012, which is incorporated herein by reference. In particular embodiments, the images associated with the first user may be presented to the second user as a series of albums. As an example and not by way of limitation, the second user may see a webpage associated with the user profile of the first user containing a series of albums. At the bottom of the webpage, the second user may see an option to browse other albums, for example, additional albums associated with the first user, albums associated with another user, or albums associated with the second user's own user profile. The albums presented to the second user may include additional information such as, for example, the titles of the albums, brief descriptions of the albums, or any other information associated with the albums or their photos. In particular embodiments, if the second user "hovers" (e.g., with a mouse) over an album, the second user may be able to "like" or comment on the album. Additionally, in particular embodiments, if the second user hovers over an album, the first N (e.g., five) photographs in the album may be automatically cycled through as the representative image of the album presented to the second user while the second user continues to hover over the album. The first user may determine which photos in the album are presented in the automatic cycle when another user hovers over the album.

In particular embodiments, an image may be associated with particular types of metadata. The metadata associated with an image may be automatically generated (e.g., by the camera that is the source of the image). Automatically-generated metadata associated with an image may, for example, include information regarding the image and may be stored as EXIF (Exchangeable Image File Format) data. The metadata may include information such as a date and time when the image was taken, the location where the image was taken (e.g., GPS coordinates), compression applied to the image, camera model, and camera settings (e.g., resolution, color information, flash usage, exposure, shutter speed, aperture, focal length, or ISO speed). In particular embodiments, metadata associated with an image may be automatically generated but manually edited before uploading to social-networking system 160 (e.g., edited in a photo application on client system 130). In other embodiments, metadata associated with an image may be manually generated (e.g., by the camera user or by the user of client system 130) before uploading to the social-networking system.

In particular embodiments, an image may be scaled to a particular size. Sometimes, an image of a relatively high resolution and thus a relatively large size needs to be displayed within a relatively small area. In practice, this often happens when the screen of the device on which the image is displayed is relatively small, such as the screen of a mobile client system (e.g., a smartphone, mobile phone, tablet computer, laptop computer), although the same need may also arise with other systems having larger screens. As an example and not by way of limitation, an image having a resolution larger than the resolution supported by the viewport of client system 130 may be zoomed out (i.e., scaled down) so that the entire image may be displayed in the viewport. Similarly, the image may be zoomed in (i.e., scaled up) so that just a portion of the image may be displayed in the viewport. Further zooming in may be possible so that the image may be magnified when displayed. In particular embodiments, the display of a mobile device can often have an aspect ratio (e.g., a ratio of width by length) different from an image. Furthermore, an aspect ratio of a display of a mobile device may depend on an orientation (e.g., portrait mode, or landscape mode) of the mobile device. For example, display resolution of a mobile device can be 960 by 640 pixels in landscape mode, or 640 by 960 pixels in portrait mode, while an image stored in social-networking system 160 may have many sizes and aspect ratios (e.g., 1920 by 1080 pixels, 1064 by 1600 pixels, 1600 by 1200 pixels, 1200 by 1200 pixels, 2592 by 1936 pixels, 3264 by 2448 pixels, etc.). In addition, different models (from different manufactures) of mobile devices can have different display resolutions and display aspect ratios. In particular embodiments, the image may be scaled in one or more dimensions based on the size or dimensions of the viewport. In particular embodiments, if the image to be scaled is more "horizontal" than the viewport (e.g., the aspect ratio of the image is greater than the aspect ratio of the viewport), then the image may be scaled to equal the height of the viewport. In particular embodiments, if the image to be scaled is more "vertical" than the viewport (e.g., the aspect ratio of the image is less than the aspect ratio of the viewport), then the image may be scaled to equal the width of the viewport. In particular embodiments, an image may be scaled before it is cropped to a particular size (e.g., the size of the viewport).

Figure 3:
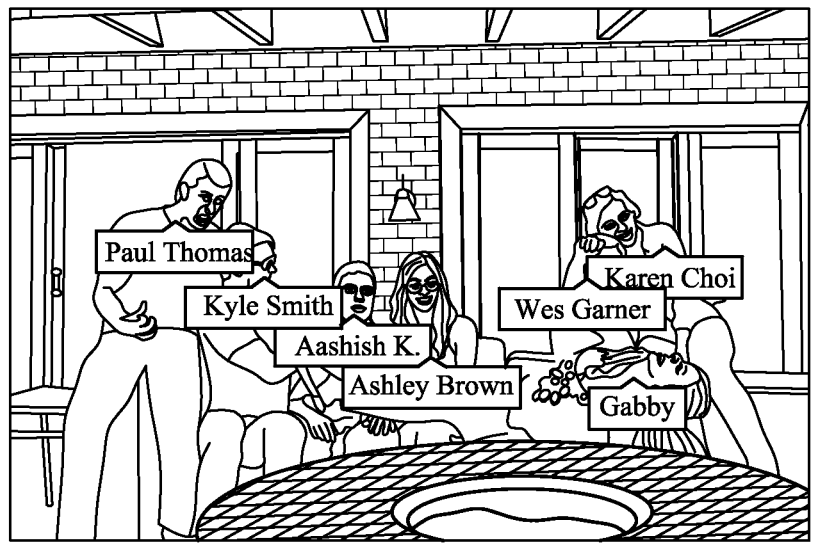
FIG. 3 illustrates an example photograph with tags.

FIG. 3 illustrates an example photograph with tags. In particular embodiments, social-networking system 160 may allow for tagging of digital images. The user who posted the image, or other users of the online social network with access to the image, may view the image to select and tag a location of the image by selecting a point or area within the image. The tagging user may also input a description of the tag, which may describe the object portrayed in the image (e.g., the name or other descriptor of the user or object portrayed in the image). Multiple locations within an image may be tagged. Where the tag corresponds to an area within the image, the tag may be indicated by a border superimposed over the digital image. In particular embodiment, the description of the tag may be displayed with the image as a tag-label. As an example and not by way of limitation, FIG. 3 illustrates a digital photograph with seven users tagged in the image. Here, the users "Paul Thomas", "Kyle Smith", "Aashish K.", "Ashley Brown", "Wes Garner", "Karen Choi", and "Gabby" are tagged in the photo. A tag-label corresponding to each tag is rendered over the image corresponding to the location of each tag, which in this case is the location of the user portrayed in the image. In FIG. 3, the description in the tag-label is the name of the tagged user, which is displayed adjacent to and below the location where the user is tagged in the image (i.e., below the user's face as portrayed in the image).

In particular embodiments, a tag may correspond to a particular edge 206 of social graph 200. Particular nodes of social graph 200 may be connected by tagged-in-type edges 206 with a concept node 204 corresponding to the image. In this way, a particular tag may correspond to a particular user or concept associated with the online social network. The tag-label associated with the tag may then be the name or other descriptor associated with the social-graph entity that corresponds to the tag. In particular embodiments, a tag may be considered a type of metadata associated with the image. As an example and not by way of limitation, if an image is a photo including one or more users of social-networking system 160, the photo may be "tagged" with metadata indicating the names or identifiers of one or more users portrayed in the photo. As another example and not by way of limitation, if the image is a photo taken at a particular location or time, the photo may be tagged with metadata including the location (which may, in particular embodiments, correspond to a concept node 204 in the social graph 200) or with date or time information, as well. Similarly, if the image is a photo that contains buildings, logos or brands, or any other concepts associated with concept nodes 204 in the social graph 200, the photo may be tagged with metadata including the identifiers of the corresponding concept nodes. In particular embodiments, the metadata associated with an image may be automatically generated by social-networking system 160. As an example and not by way of limitation, social-networking system 160 may automatically tag an image with metadata including the identifier of the user who uploaded the image. As another example and not by way of limitation, social-networking system 160 may automatically detect one or more faces in an uploaded image. This may, for example, be done using a face-recognition algorithm. Based on the faces detected in the uploaded image, social-networking system 160 may automatically determine that one or more users of social-networking system 160 are present in the image and may (depending on the users' individual privacy settings) tag the image with metadata including the identifiers of those users present in the image and furthermore generated tagged-in-type edges 206 connecting the user nodes 202 of the identified users with the concept node 204 corresponding to the image. As another example and not by way of limitation, social-networking system 160 may automatically detect locations, buildings, logos or brands, or any other concepts associated with concept nodes in the social graph in an uploaded image (e.g., using computer vision algorithms). Social-networking system 160 may automatically tag the image with metadata including the identifiers of those concept nodes in the social graph that correspond to the automatically detected items.

Figure 4A:
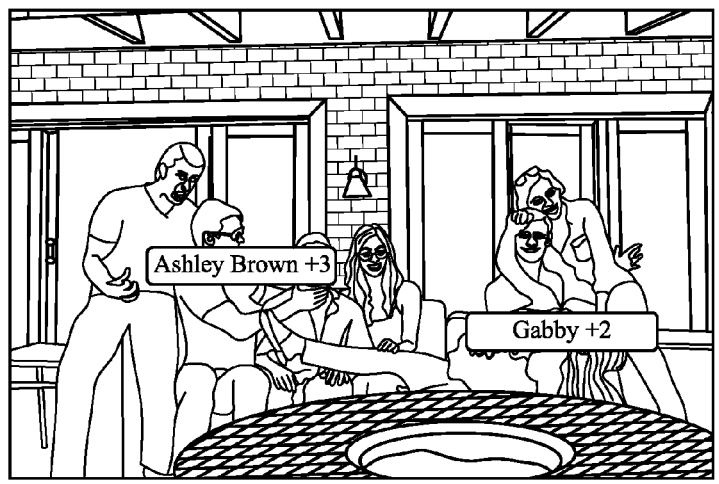
FIGS. 4A-4C illustrate an example photograph with aggregated tags.
Figure 4B:
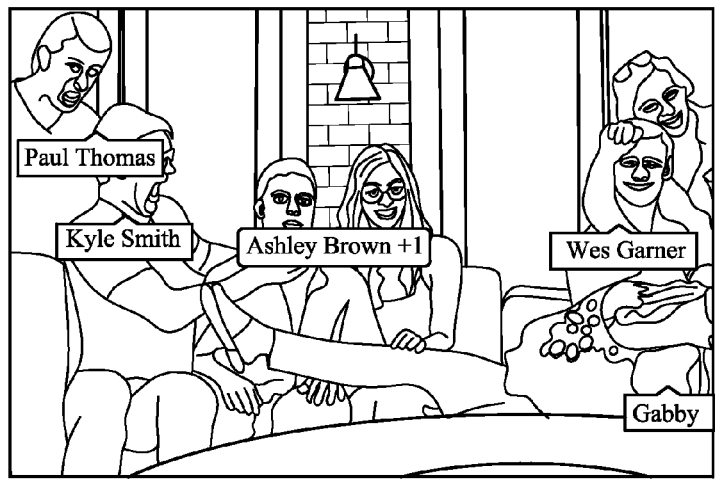
Figure 4C:
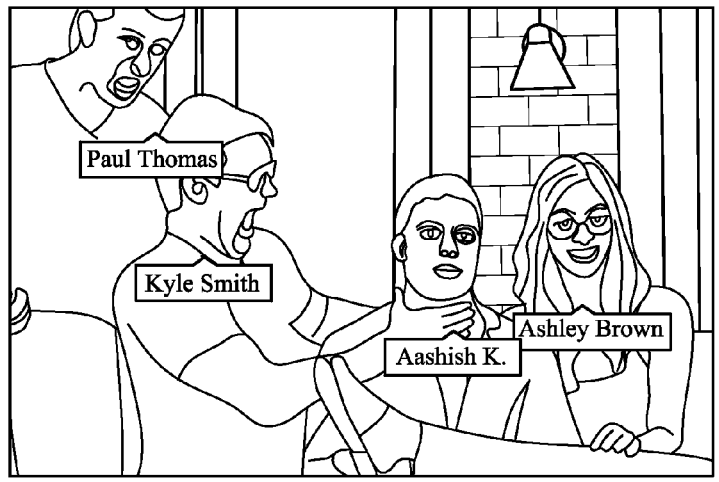

FIGS. 4A-4C illustrate an example photograph with aggregated tags. In particular embodiments, where an image has multiple objects tagged in the image, social-networking system 160 may aggregate two or more of the tags and render the image showing an aggregated tag representing the individual tags. When an image that has multiple objects tagged in it is rendered, the tag-labels for each tag may begin to overlap of the locations of the tagged objects are relatively close to each other in the photo. Similarly, the tags may begin to overlap (or overlap more) if the user zooms out so that the relative distance between the objects decreases. The problem of overlapping tag-labels may be especially pronounced in images with numerous tagged items, or when viewing images on relatively small displays (e.g., the display of a mobile client system 130), such that the tag-labels begin to impair viewing of the image or make the tag-labels themselves difficult to read. In these cases, tags for a group of objects may be aggregated into a single aggregated tag. As an example and not by way of limitation, FIG. 4A illustrates the example photograph from FIG. 3, where seven users are tagged in the photo. In FIG. 3, the numerous tag-labels make the image appear cluttered. However, in FIG. 4A, several of the tags have been aggregated. For example, for the group of tags on the left-hand side of the image, instead of displaying four individual tag-labels for the four users tagged in the image (as was done in FIG. 3), a single aggregated tag has been generated for these users with a tag-label showing "Ashley Brown +3". The tag-label for an aggregated tag may be generated based on the social-graph affinity of the object included in the aggregated tag. For example, the user "Ashley Brown" may be referenced in the tag-label for the aggregated tag for "Ashley Brown +3" because of the social-graph affinity for that user with respect to the viewing user. Individual tags may be aggregated to form an aggregated tag once the individual tags are within a threshold distance of each other. Replacing individual tags with aggregated tags may help remove visual clutter from the image and improve readability of tag-labels. FIGS. 4B and 4C illustrate the example photo from FIG. 4A at progressively higher zoom factors. The objects included in an aggregated tag may be varied as the viewing user zooms in and out of the image, such that additional objects may be added to the aggregated tag as the user zooms out, and objects may be removed from the aggregated tag as the user zooms in (i.e., the aggregated tag may begin to de-aggregate), as shown in FIGS. 4B and 4C. Although FIGS. 4A-4C and this disclosure describe generating particular aggregated tags in a particular manner, this disclosure contemplates generating any suitable aggregated tags in any suitable manner. Moreover, although FIGS. 4A-4C and this disclosure describe generating aggregated tags with respect to photo, this disclosure contemplates generating aggregated tags for any type of digital image that can be tagged. For example, a similar method could be use to aggregate location tags on a map.

In particular embodiments, social-networking system 160 may receive, from a first user associated with an online social network, a request to view an image associated with the online social network. The request may be received, for example, from a client system 130 associated with the first user. In response to the request, social-networking system 160 may access the image. The image may comprise one or more tags corresponding to a plurality of objects associated with the online social network, respectively. Each object may, for example, correspond to a particular social-graph entity (e.g., a user node 202 or a concept node 204 of social graph 200). Each tag may be associated with a particular location (e.g., a point or area) within the image. As an example and not by way of limitation, referencing FIG. 4C, the image illustrates a portion of a photo with four users tagged in the photo: "Paul Thomas", "Kyle Smith", "Aashish K.", "Ashley Brown". The tag for each of these users corresponds to a particular location on the photo, which in this case is the region of the photo portraying the face of each user. The tag-labels with their names are displayed just below their faces. In particular embodiments, one of the tags may correspond to the first user (i.e., the requesting user). As an example and not by way of limitation, if the image portrays the requesting user (for example, if the first user happens to be "Ashley Brown" from FIGS. 4A-4C), the location where the requesting user is portrayed may be tagged with identifying information corresponding to the requesting user (e.g., the name or identifier of the user). Although this disclosure describes requesting and accessing images in a particular manner, this disclosure contemplates requesting and accessing images in any suitable manner.

In particular embodiments, social-networking system 160 may generate an aggregated tag from two or more individual tags in an image. The generation of the aggregated tag may be based on a distance of the locations of the tags to each other. Tags associated with locations within a threshold distance of each other may joined with (i.e., aggregated with) the aggregated tag. As an example and not by way of limitation, the threshold distance may be a percentage overlap of the area associated with each tag. If the area of a first tag overlaps with the area of a second tag by, for example, 20% (though any suitable distance, fraction, or percentage may be used), then social-networking system 160 may aggregate those two tags into a single aggregated tag. In particular embodiments, social-networking system 160 may calculate for each tag the distance of the location of the tag from the location of every other tag of the image. The distance may be measured in any suitable manner. As another example and not by way of limitation, the distance may be measured as a fraction of one of the dimensions of the image, a fraction of one of the dimensions of the viewport, a distance across the viewport (e.g., in inches or pixels of the viewport), another suitable measure of distance, or any combination thereof. Although this disclosure describes generating aggregated tags in a particular manner, this disclosure contemplates generating aggregated tags in any suitable manner.

In particular embodiments, social-networking system 160 may determine a social-graph affinity for each object associated with a tag in an image. Social-graph affinity may be determined in any suitable manner. The relevance of a social context of an image to a particular user may be determined based on information gathered from social graph 200. As an example and not by way of limitation, images available for display to a user (e.g., when the user is viewing another's profile) may include images having the social context(s) of: being associated with or depicting the user, being associated with or depicting other users connected to the user in the social graph (which may be limited to users connected to the user within a particular degree of separation, users within a particular group or organization, the degree of separation between the node corresponding to the tagged object and the user node 202 corresponding to the user accessing the image, users sharing particular interests or affinities with the user, or users having a similar profile as the user or a target demographic profile), being associated with or depicting particular users or concepts that the user is following, being associated with or depicting an event the user attended, being associated with or depicting an event that those connected to the user in the social graph were invited to or attended, being associated with or depicting a location or business the user frequents, viewing other images depicting particular users, accessing profile pages associated with particular users, selecting tags associated with particular users, other suitable social contexts, or any combination thereof. Social-networking system 160 may determine the social-graph affinity based on one or more of the factors listed above, or any other relevant factors described herein. As an example and not by way of limitation, a number of users depicted in the image who are connected to the user in the social graph may affect the social-graph affinity. As another example, the type of connection between the user and the users depicted in the image may affect the social-graph affinity. Social-networking system 160 may also determine a relevance of the social context(s) of an image to a user based at least in part on the user's interests. The interest value may be based at least in part on whether a social context of the image coincides with a category or categories associated with the user's interests. The interest value may, for example, be based at least in part on whether people, locations, objects, or actions depicted in the image coincide with the category or categories associated with the user's interests. Although this disclosure describes determining social-graph affinity for particular objects in a particular manner, this disclosure contemplates determining social-graph affinity for any suitable objects in any suitable manner.

In particular embodiments, social-networking system 160 may render the image with a tag-label for the aggregated tag. The tag-label may include a description of the objects associated with the aggregated tag. Social-networking system 160 may also render the image with a tab-label for each tag of the image that is not associated with an aggregated tag. As an example and not by way of limitation, referencing FIG. 4A, for the group of tagged users on the left-hand side of the image, instead of displaying four individual tag-labels for the four users tagged in the image (as illustrated in FIG. 3), a single aggregated tag may instead be shown for those users, with a tag-label reading "Ashley Brown +3", which corresponds to the aggregated tag for the users "Paul Thomas", "Kyle Smith", "Aashish K.", "Ashley Brown". In other words, this tag-label for the aggregated tag is describing the aggregated tag as corresponding to "Ashley Brown" and three other user (i.e., "+3"). Similarly, for the group of tags on the right-hand side of the image, instead of displaying the three individual tag-labels for "Wes Garner", "Karen Choi", and "Gabby", as illustrated in FIG. 3, social-networking system 160 has aggregated the tags and is instead displaying a single aggregated tag with the tag-label "Gabby +2" for this group of user. In particular embodiments, the description of the tag-label may be based on the social-graph affinity for the objects associated with the aggregated tag. As an example and not by way of limitation, the tag-label for the aggregated tag may comprise the name of the object having the strongest social-graph affinity with respect to the first user. Referencing FIG. 4A, for the aggregated tag on the right-hand side of the image, the tag-label may reference the user "Gabby" because that user has the strongest social-graph affinity with respect to the viewing user out of the three users associated with that particular aggregated tag. In particular embodiments, the description of the tag-label may be based on one or more social-graph entities references in a structured query used to find the image. A structured query is a query comprising references to particular social-graph elements. When the querying user is searching for content objects related to particular social-graph entities using a structured query, the tag-labels in an aggregated tag may then be based on the entities references in the query. As an example and not by way of limitation, if the querying user inputs a structured query for "Photos of Ashley Brown", then photos that match this query may have aggregated tags that show that the user referenced in the query, "Ashley Brown" is part of the aggregated tag. More on structured queries may be found in U.S. patent application Ser. No. 13/556,046, filed 23 Jul. 2012, and U.S. patent application Ser. No. 13/732,101, filed 31 Dec. 2012, each of which is incorporated by reference. In particular embodiments, social-networking system 160 may abbreviate the description of the object based on the social-graph affinity of the object with respect to the first user. Where the viewer has a strong social-graph affinity for a particular object, the viewer may not need to see the full name for that object, and an abbreviation may suffice. Similarly, if the name of the user tagged in the image is relatively unique (or at least unique with respect to the viewing user), an abbreviation may suffice. It may be advantageous to abbreviate some tag-labels, for example when the name is long or when the tag-labels are positioned closely together, in order to remove clutter from the image. As an example and not by way of limitation, referencing FIG. 4C, for the tag-label for "Aashish K.", social-networking system 160 may have abbreviated the user's name (i.e., used the user's last initial instead of the user's full last name) because that particular user may have a strong social-graph affinity with respect to the viewing user. Alternatively, rather than having a strong social-graph affinity for "Aashish K.", this may be the only user that the viewing user knows with the first name "Aashish", and thus social-networking system 160 may determine that using an abbreviation is sufficient since there is little chance of confusion. Although this disclosure describes rendering particular images in a particular manner, this disclosure contemplates rendering any suitable images in any suitable manner.

In particular embodiments, social-networking system 160 may send the rendered image to a browser client associated with the first user for display to the first user. The browser client may be on a client system 130 of the first user. The image may be rendered so that it can be displayed in the viewport of the client system (e.g., the display). The tag-labels associated with each tag may be displayed overlaying the image in an area proximate to the location associated with the tag. In particular embodiments, a user may select (e.g., click on) an aggregated tag and it will display a list of who's in that tag. As an example and not by way of limitation, referencing FIG. 4A, if the viewing user selected the aggregated tag labeled "Gabby", social-networking system 160 may respond to this selection by displaying a list of the users associated with that aggregated tags, which would be "Gabby", "Wes Garner", and "Karen Choi". The list may be displayed, for example, as a drop-down list from the tag-label of the aggregated tag. Alternatively, in particular embodiments, a user may select an aggregated tag, and in response the system may automatically zoom in on that location and de-aggregate the tags, allowing the viewing user to see the individual tags that comprises the selected aggregated tag. As an example and not by way of limitation, referencing FIG. 4A, if the viewing user selected the aggregated tag labeled "Ashley Brown +3", social-networking system 160 may respond to this selection by zooming in on that location as shown in FIG. 4C, and then de-aggregating all of the component tags to show the individual tags for the four users associated with that aggregated tag. Although this disclosure describes sending particular images in a particular manner, this disclosure contemplates sending any suitable images in any suitable manner.

In particular embodiments, social-networking system 160 may dynamically render the image in response to the first user (i.e., the requesting user) changing a zoom level for the image. As the viewing user changes the zoom level of an image, social-networking system 160 may recalculate for each tag the distance of the location of the tag from the location of every other tag of the image. If the change in zoom level is zooming in, then social-networking system 160 may re-generate the aggregated tag based on the recalculated distance of the locations of the tags to each other such that the re-generated aggregated tag is aggregated with at least one fewer tag in the image. In other words, as the viewing user zooms in on the image, the tags may begin to de-aggregate. However, if the change in zoom level is zooming out, then social-networking system 160 may re-generate the aggregated tag based on the recalculated distance of the locations of the tags to each other such that the re-generated aggregated tag is aggregated with at least one more tag in the image. In other words, as the viewing user zooms out, additional tags may be included in the aggregated tag (and if there are already multiple aggregated tags, these may also merge into a larger aggregated tag if they begin to overlap). The aggregated tags may be generated once the tags begin to overlap by a threshold amount (e.g. more than 20%). As an example and not by way of limitation, referencing FIGS. 4A-4C, if the user is viewing the image as illustrated in FIG. 4B, and then zooms in to view the image as illustrated in FIG. 4C, the aggregated tag from FIG. 4B of "Ashley Brown +1" may de-aggregate into two separate tags for "Ashley Brown" and "Aashish K." However, if the user is viewing the image as illustrated in FIG. 4B, and then zooms out to view the image as illustrated in FIG. 4A, the aggregated tag for "Ashley Brown +1" will essentially grow to include the individual tags for "Paul Thomas" and "Kyle Smith", and social-networking system 160 may then generate a new aggregated tag for "Ashley Brown +3". Although this disclosure describes zooming particular images in a particular manner, this disclosure contemplates zooming any suitable images in any suitable manner.

Figure 5:
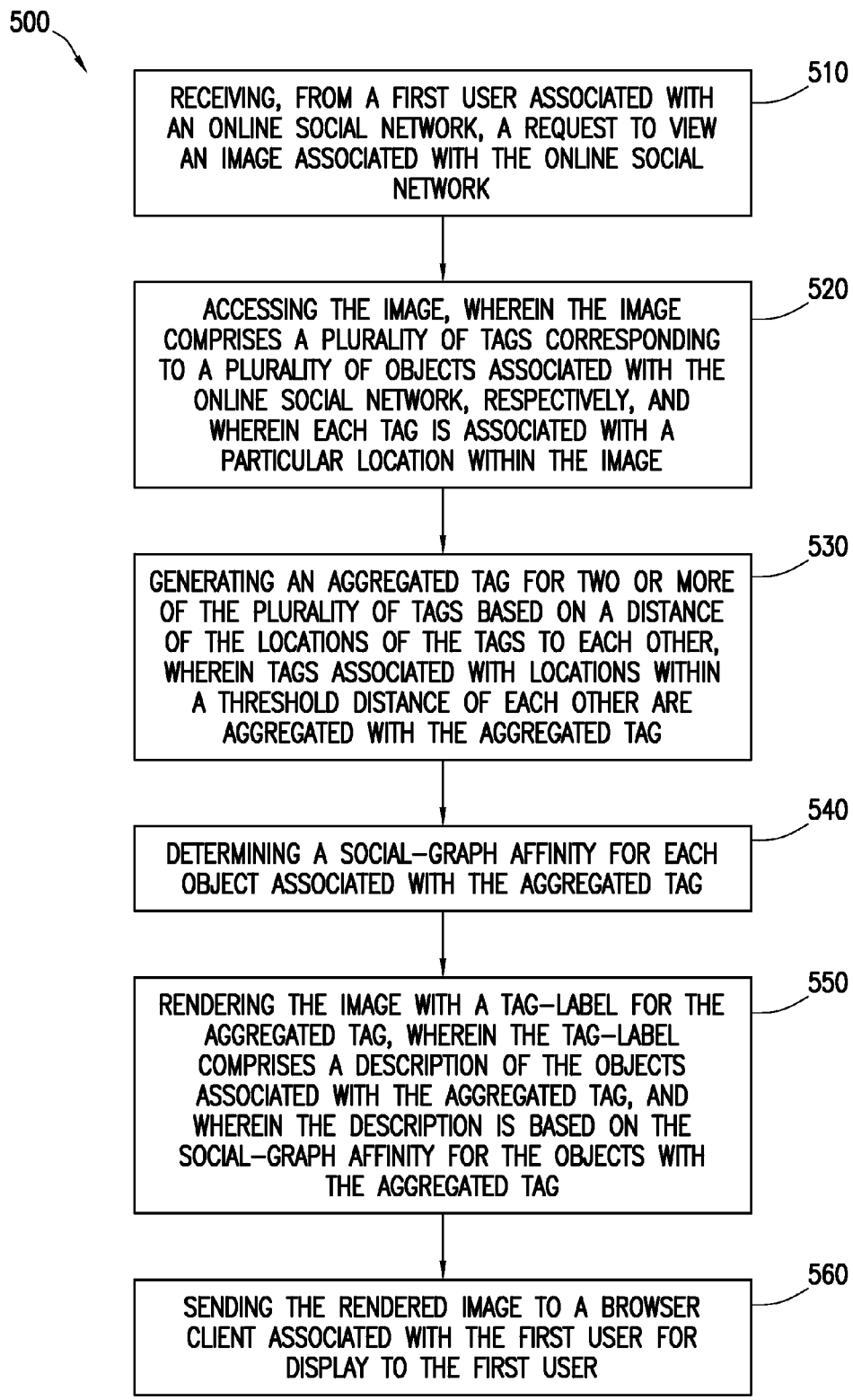
FIG. 5 illustrates an example method for aggregating tags in images.

FIG. 5 illustrates an example method 500 for aggregating tags in images. The method may begin at step 510, where social-networking system 160 may receive, from a first user associated with an online social network, a request to view an image associated with the online social network. In particular embodiments, the online social network may include a social graph 200 comprising a plurality of nodes and a plurality of edges connecting the nodes, where each node may correspond to a particular user or concept associated with the online social network. At step 520, social-networking system 160 may access the image, wherein the image may comprises a plurality of tags corresponding to a plurality of objects associated with the online social network. Each tag may be associated with a particular location within the image, such as a point or area within the image. At step 530, social-networking system 160 may generate an aggregated tag for two or more of the plurality of tags based on a distance of the locations of the tags to each other. Tags associated with locations within a threshold distance of each other may be aggregated with the aggregated tag. At step 540, social-networking system 160 may determine a social-graph affinity for each object associated with the aggregated tag. The social-graph affinity may be determined in any suitable manner, as described previously. At step 550, social-networking system 160 may render the image with a tag-label for the aggregated tag. The tag-label may include a description of the objects associated with the aggregated tag, and the description may be based on the social-graph affinity of the objects. At step 560, social-networking system 160 may send the rendered image to a browser client associated with the first user for display to the first user. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
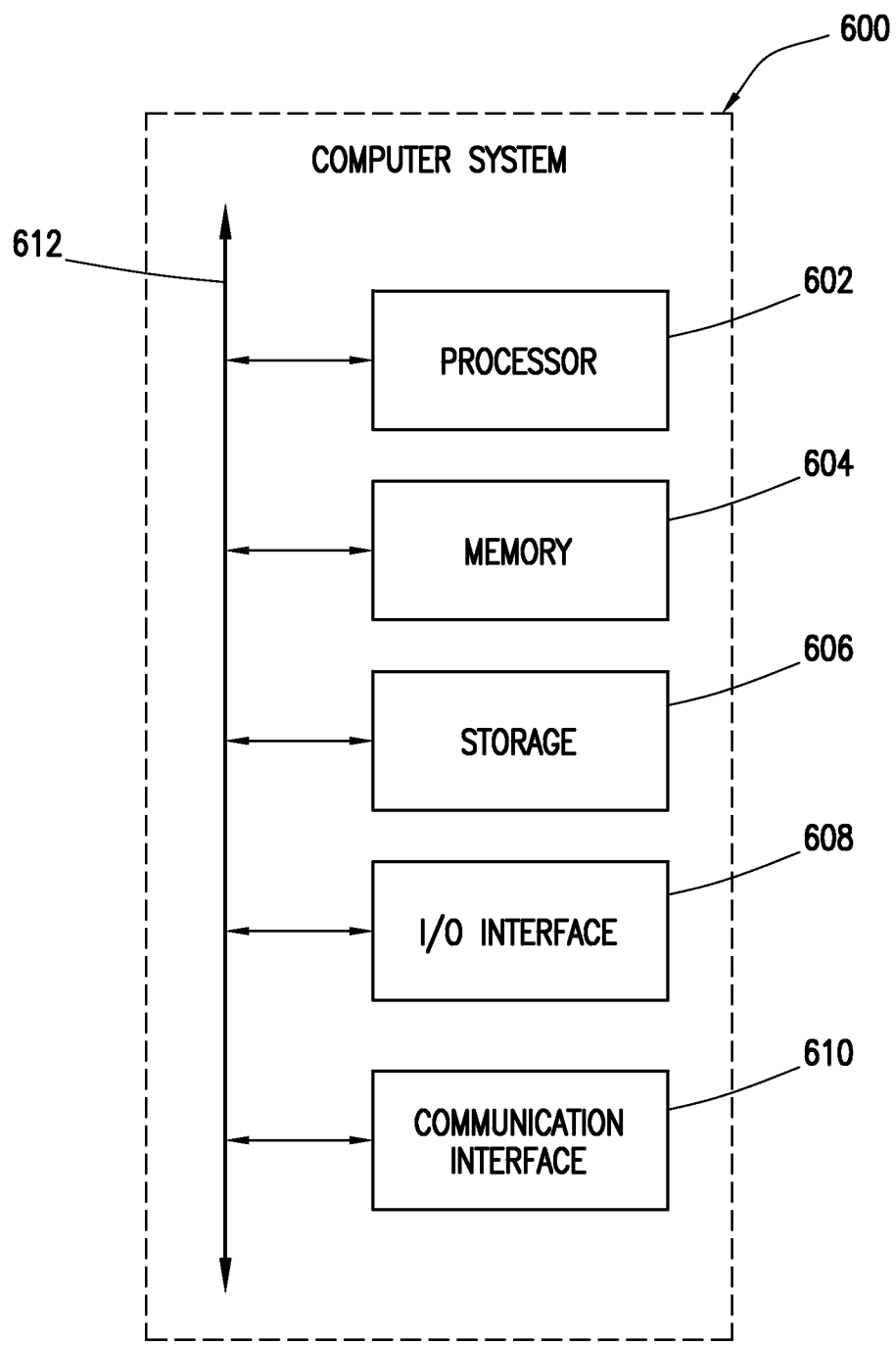
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a client system of a first user associated with an online social network:
   receiving, at the client system from a social-networking system of the online social network, an image associated with the online social network, wherein the image comprises a plurality of tags corresponding to a plurality of users associated with the online social network, respectively, and wherein each tag is associated with a particular location within the image;
   generating, by the client system, an aggregated tag for two or more of the plurality of tags based on a distance of the locations of the tags to each other, wherein tags associated with locations within a threshold distance of each other are aggregated with the aggregated tag;
   accessing, from the social-networking system, a social-graph affinity for each user associated with the aggregated tag;
   rendering, by the client system, the image with a tag-label for the aggregated tag, wherein the tag-label comprises a name of the user having the strongest social-graph affinity with respect to the first user and a counter indicating a number of users corresponding to the aggregated tag; and providing, to a display of the client system, the rendered image for presentation to the first user.

2. The method of claim 1, wherein the client is a browser client of the client system.

3. The method of claim 1, further comprising:
accessing a social graph comprising a plurality of nodes and a plurality of edges connecting the nodes, each of the edges between two of the nodes representing a single degree of separation between them, the nodes comprising:
a first node corresponding to the first user; and
a plurality of second nodes that each correspond to a concept or a second user associated with the online social network.

4. The method of claim 3, wherein one or more of the users corresponds to one or more second nodes, respectively.

5. The method of claim 4, wherein the social-graph affinity for each user is based on a degree of separation between the second node corresponding to the user and the first node.

6. The method of claim 1, wherein the image further comprises a tag corresponding to the first user.

7. The method of claim 1, wherein the image is a photograph.

8. The method of claim 1, wherein the particular location associated with each tag is a point within the image.

9. The method of claim 1, wherein the particular location associated with each tag is an area within the image.

10. The method of claim 9, wherein the threshold distance is measured as a threshold percentage overlap of the area associated with each tag.

11. The method of claim 1, further comprising calculating for each tag the distance of the location of the tag from the location of every other tag of the image.

12. The method of claim 11, further comprising:
responsive to the first user changing a zoom level for the image, recalculating for each tag the distance of the location of the tag from the location of every other tag of the image; and
if the change in zoom level is zooming in, then re-generating the aggregated tag based on the recalculated distance of the locations of the tags to each other, wherein the re-generated aggregated tag is aggregated with at least one fewer tag of the plurality of tags; and
if the change in zoom level is zooming out, then re-generating the aggregated tag based on the recalculated distance of the locations of the tags to each other, wherein the re-generated aggregated tag is aggregated with at least one more tag of the plurality of tags.

13. The method of claim 1, further comprising rendering the image with a tag-label for each tag of the plurality of tags not associated with the aggregated tag.

14. The method of claim 1, wherein one or more of the users corresponds to one or more second users associated with the online social network, respectively.

15. The method of claim 1, wherein one or more of the users corresponds to one or more concepts associated with the online social network, respectively.

16. The method of claim 1, further comprising:
receiving, at the client system, an input from the first user requesting to view the image; and
sending, by the client system to the social-networking system; a request for the image.

17. One or more computer-readable non-transitory storage media embodying software that is operable when executed to:
receive, at a client system of a first user associated with an online social network from a social-network system of the online social network, an image associated with the online social network, wherein the image comprises a plurality of tags corresponding to a plurality of users associated with the online social network, respectively, and wherein each tag is associated with a particular location within the image;
generate, by the client system, an aggregated tag for two or more of the plurality of tags based on a distance of the locations of the tags to each other, wherein tags associated with locations within a threshold distance of each other are aggregated with the aggregated tag;
access, from the social-networking system, a social-graph affinity for each user associated with the aggregated tag; and
render, by the client system, the image with a tag-label for the aggregated tag, wherein the tag-label comprises a name of the user having the strongest social-graph affinity with respect to the first user and a counter indicating a number of users corresponding to the aggregated tag; and
provide, to a display of the client system, the rendered image for presentation to the first user.

18. A client system of a first user comprising: one or more processors; and a memory coupled to the processors comprising instructions executable by the processors, the processors operable when executing the instructions to:
receive, at the client system from a social-networking system of an online social network, an image associated with an online social network, wherein the image comprises a plurality of tags corresponding to a plurality of users associated with the online social network, respectively, and wherein each tag is associated with a particular location within the image;
generate, by the client system, an aggregated tag for two or more of the plurality of tags based on a distance of the locations of the tags to each other, wherein tags associated with locations within a threshold distance of each other are aggregated with the aggregated tag;
access, from the social-networking system, a social-graph affinity for each user associated with the aggregated tag; and
render, by the client system, the image with a tag-label for the aggregated tag, wherein the tag-label comprises a name of the user having the strongest social-graph affinity with respect to the first user and a counter indicating a number of users corresponding to the aggregated tag; and
provide, to a display of the client system, the rendered image for presentation to the first user.

* * * * *